Sept. 15, 1964  A. OSSENBRUNNER ETAL  3,148,985
POLYCARBONATE BASE PHOTOGRAPHIC FILM INCLUDING
MULTIPLE LAYER SUBBING STRATUM
Filed Sept. 13, 1960
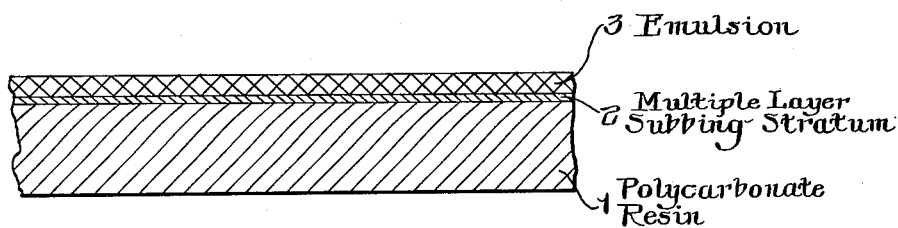
INVENTORS
Armin Ossenbrunner,
Hermann Schnell,
Helfried Klockgether,
Julius Geiger &
BY   Joachim Freier
Connolly and Hutz
ATTORNEYS

United States Patent Office 3,148,985
Patented Sept. 15, 1964

---

3,148,985
POLYCARBONATE BASE PHOTOGRAPHIC FILM INCLUDING MULTIPLE LAYER SUBBING STRATUM
Armin Ossenbrunner, Leverkusen, Hermann Schnell, Krefeld-Uerdingen, Helfried Klockgether and Julius Geiger, Leverkusen, and Joachim Freier, Krefeld-Uerdingen, Germany, assignors to Agfa Aktiengesellschaft, Leverkusen, Germany, a corporation of Germany
Filed Sept. 13, 1960, Ser. No. 55,636
4 Claims. (Cl. 96—87)

Various plastics have already been recommended as supporting layers for photographic materials, but only a few of them have proved satisfactory, since comparatively high standards are required of the photographic supporting layers, for example, as regards their mechanical properties. Even such known replacement of the readily inflammable nitrocellulose by the non-inflammable acetyl cellulose must be accepted with certain disadvantages. The most serious of these are the substantially greater sensitivity to water and the inferiority of the mechanical properties of acetyl cellulose. The first disadvantage is mainly apparent with those types of films with which it is necessary to have the maximum dimensional stability (accuracy of size), particularly with films which are used to control manufacturing operations.

Despite great improvements as regards the mechanical properties which could be produced with acetyl cellulose, the quality of the nitrocellulose film has still not quite been reached, this being particularly noticeable in a shorter effective life of cinematograph films.

Attempts to use other plastics for film supports have not been very successful. Copolymers of polyvinyl chloride with other components, for example, maleic acid esters, have been used as a support which maintains its dimensions, but these copolymers do not have good mechanical properties, it is only with very great difficulty that they can be produced in long rolls and in a uniform quality with a highly glazed surface, and it is only with difficulty that they can be provided with a bonding layer which will guarantee a sufficient bonding of the light-sensitive layer.

The bonding difficulty is associated with the low softening point of these copolymers, in the region of 80° C., and the lowering of the softening point when bonding layers are applied. It appears that solvents used in the bonding layers are absorbed by these copolymers, and it is only with very great difficulty that it is possible to satisfactorily dry the combination of support and bonding layer. Solvent absorption must also be minimized if the dimensions are to be satisfactorily maintained.

Another plastic which is suitable as a film support on account of its mechanical properties, as well as on account of its water-repelling properties, is the polyester of terephthalic acid and glycol. The excellent properties of this plastic are however counteracted by very great difficulties in manufacture, particularly caused by the high melt viscosity and the great tendency of this plastic to crystallize. In the same way as all films which are not manufactured by the casting process, this material also has the defects of non-uniform thickness, the more or less matt or uneven surface and also incomplete cleanliness, which is particularly important with photographic film.

It has now been found that sheets of films of polycarbonates of bis(monohydroxyaryl)alkanes and sulfones, are excellently suitable as supporting layers for photographic materials of the type referred to. Such polycarbonates correspond to the general formula:

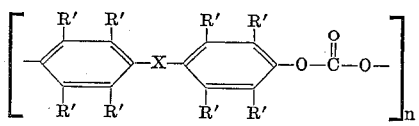

wherein X is selected from the group consisting of

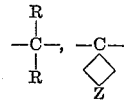

and

each R being selected from the group consisting of hydrogen, unbranched and branched monovalent aliphatic hydrocarbon radicals containing up to 10 carbon atoms, monovalent cycloaliphatic radicals, monovalent araliphatic hydrocarbon radicals having up to 4 carbon atoms in the aliphatic portion, phenyl and furyl radicals, Z represents the carbon and hydrogen atoms completing a cycloaliphatic ring, each R' represents a member of the group consisting of hydrogen, monovalent unbranched and branched aliphatic hydrocarbon radicals containing up to 5 carbon atoms, monovalent cycloaliphatic and aromatic hydrocarbon radicals having up to two rings, and $n$ represents a number greater than 20, and preferably greater than 50. The cycloaliphatic radicals referred to above can have from 5 to 8 carbon atoms per ring.

Preferred polycarbonates are such in which each R' is a hydrogen atom and each R is an aliphatic or cycloaliphatic hydrocarbon radical of the kind mentioned above, the R's being the same or different members of the group mentioned above, for instance aliphatic and cycloaliphatic hydrocarbon radicals.

Examples of polycarbonates according to the invention are such of the above formula, in which (1) both R and all R's are hydrogen atoms, (2) one R is a hydrogen atom, the other R is methyl, ethyl, n-propyl, isopropyl, n-butyl, isobutyl, sec-butyl, tert-butyl, n-heptyl, n-octyl, n-nonyl, n-decyl, 1-methyl-$\Delta^1$-butenyl, 1-ethyl-$\Delta^1$-pentenyl, cyclopentyl, cyclohexyl, benzyl, furyl, unsubstituted phenyl, phenyl substituted in the para position by methyl-, ethyl-, n-propyl-, isopropyl-, or butyl substituents, and all R's are hydrogen atoms, (3) each R is the same or a different member of the last group of hydrocarbon radicals and all R's are hydrogen atoms, (4) X is

Z representing the carbon and atoms completing the cyclopentane or the cyclohexane ring and R' is hydrogen, or (5) each R represents a hydrogen atom or the same or a different member of the last-mentioned group of hydrocarbon radicals and each R' represents a member of the group consisting of methyl, ethyl, n-propyl, isopropyl, n-butyl, tert-butyl, isobutyl, tert-amyl, cyclopentyl, cyclohexyl, and phenyl radicals.

Under these polycarbonates typical representatives are for instance poly - 2,2-bis-(4-hydroxyphenyl)-propane-carbonate, poly - 2,2-bis-(4-hydroxyphenyl)-pentane-carbonate, poly-1,1-bis-(4 - hydroxyphenyl)-cyclohexane-carbonate, mixed poly-2,2-bis-(4-hydroxyphenyl)-propane- and bis-(4-hydroxyphenyl)-methane-carbonates and poly-(4-hydroxyphenyl)-sulfone carbonate. Other suitable polycarbonates are set forth in U.S. patent application Serial No. 8,931, filed February 16, 1960. Similar polycarbonates in which the sulfone bridge is replaced by an ether or thioether bridge or a sulfoxide bridge as in U.S. patent application Serial No. 688,822, filed October 8, 1957, can also be used.

Such polycarbonates can be prepared, for example, by reacting substantially equimolar amounts of the corresponding di-(monohydroxyaryl) alkanes with bis-chlorocarboxylic acid esters of di-(monohydroxyaryl) alkanes, or with phosgene or with carbonic acid diesters, for example, as described in Belgian Patent No. 532,543 and U.S. patent application Serial No. 557,256, filed January 4, 1956. The bis-hydroxy compounds in these processes are bis-(monohydroxyaryl) alkanes of the generic formula:

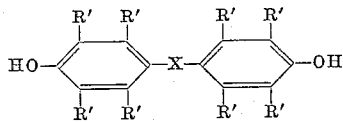

wherein X and R' represent the same atoms or groups as in the first formula. The two phenolic radicals may be the same or different.

Suitable di-(monohydroxyaryl) alkanes are for example:
4,4'-dihydroxy-diphenyl-methane,
1,1-(4,4'-dihydroxy-diphenyl)-ethane,
1,1-(4,4'-dihydroxy-diphenyl)-propane,
1,1-(4,4'-dihydroxy-diphenyl)-butane,
1,1-(4,4'-dihydroxy-diphenyl)-2-methyl-propane,
1,1-(4,4'-dihydroxy-diphenyl)-heptane,
1,1-(4,4'-dihydroxy-diphenyl)-1-phenyl-methane,
(4,4'-dihydroxy-diphenyl)-(4-methyl-phenyl)-methane,
(4,4'-dihydroxy-diphenyl)-(4-ethyl-phenyl)-methane,
(4,4'-dihydroxy-diphenyl)-(4-isopropyl-phenyl)-methane,
(4,4'-dihydroxy-diphenyl)-(4-butyl-phenyl)-methane,
(4,4'-dihydroxy-diphenyl)-benzyl-methane,
(4,4'-dihydroxy-diphenyl)-alpha-furyl-methane,
2,2-(4,4'-dihydroxy-diphenyl)-propane (also known as bisphenol A)
2,2-(4,4'-dihydroxy-diphenyl)-butane (also known as bisphenol B)
2,2-(4,4'-dihydroxy-diphenyl)-pentane (melting point: 149–150° C.),
2,2-(4,4'-dihydroxy-diphenyl)-4-methyl-pentane,
2,2-(4,4'-dihydroxy-diphenyl)-heptane (boiling point: 198–200° C. under 0.3 mm. mercury gauge),
2,2-(4,4'-dihydroxy-diphenyl)-octane,
2,2-(4,4'-dihydroxy-diphenyl(-nonane (melting point: 68° C.),
1,1-(4,4'-dihydroxy-diphenyl)-1-phenyl-ethane,
(4,4'-dihydroxy-diphenyl)-1-(alpha-furyl)-ethane,
3,3-(4,4'-dihydroxy-diphenyl)-pentane,
4,4-(4,4'-dihydroxy-diphenyl)-heptane,
1,1-(4,4'-dihydroxy-diphenyl)-cyclopentane,
1,1-(4,4'-dihydroxy-diphenyl)-cyclohexane,
2,2-(4,4'-dihydroxy-diphenyl)-decahydronaphthalene (melting point: 181° C.),
2,2-(4,4'-dihydroxy-3,3'-dicyclohexyl-diphenyl)-propane (melting point: 144–146° C.),
2,2-(4,4'-dihydroxy-3-methyl-diphenyl)-propane (melting point: 114° C.),
2,2-(4,4'-dihydroxy-3-isopropyl-diphenyl)-butane,
1,1-(4,4'-dihydroxy-3,3'-dimethyl-diphenyl)-cyclohexane,
2,2-(4,4'-dihydroxy-3,3'-dibutyl-diphenyl)-propane,
2,2-(4,4'-dihydroxy-3,3-diphenyl-diphenyl)-propane,
2,2-(4,4'-dihydroxy-2,2'-dimethyl-diphenyl)-propane (also known as bisphenol C),
1,1-(4,4'-dihydroxy-3,3'-dimethyl-6,6'-dibutyl-diphenyl)-butane,
1,1-(4,4'-dihydroxy-3,3'-dimethyl-6,6'-di-tert-butyl-diphenyl)-ethane,
1,1-(4,4'-dihydroxy-3,3'-dimethyl-6,6'-di-tert-butyl-diphenyl)-propane,
1,1-(4,4'-dihydroxy-3,3'-dimethyl-6,6'-di-tert-butyl-diphenyl)-butane,
1,1-(4,4'-dihydroxy-3,3'-dimethyl-6,6'-di-tert-butyl-diphenyl)-isobutane,
1,1-(4,4'-dihydroxy-3,3'-dimethyl-6,6'-di-tert-butyl-diphenyl)-heptane,
1,1-(4,4'-dihydroxy-3,3'-dimethyl-6,6'-di-tert-butyl-diphenyl)-1-phenyl-methane,
1,1-(4,4'-dihydroxy-3,3'-dimethyl-6,6-di-tert-butyl-diphenyl)-2-methyl-pentane,
1,1-(4,4'-dihydroxy-3,3'-dimethyl-6,6-di-tert-butyl-diphenyl)-2-ethyl-hexane, and
1,1-(4,4'-dihydroxy-3,3'-dimethyl-6,6'-di-tert-amyl-diphenyl)-butane,
bis-(4-hydroxyphenyl)-sulfone,
bis-(4-hydroxy-3-methyl-phenyl)-sulfone.

For the formation of the polycarbonates, it is also possible to use mixtures of various di-(monohydroxyaryl) alkanes or sulfones as well as mixtures with 10 to 50 mol percent of other dihydroxy compounds, such as aliphatic or cycloaliphatic dihydroxy compounds as well as aromatic dihydroxy compounds which are different from those mentioned above.

As examples of the accompanying dihydroxy compounds which may be used according to the invention, the following are named by way of example:

Aliphatic dihydroxy compounds such as: ethylene glycol, diethylene glycol, triethylene glycol, polyethylene glycol, thiodiglycol, ethylene dithiodiglycol, the di-, and polyglycols produced from 1,2-propylene oxide, o, m, or p-xylylene glycol, propanediol-1,3, butanediol-1,3, butanediol-1,4, 2-methylpropanediol-1,3, pentanediol-1,5, 2-ethyl propanediol-1,3, hexanediol-1,6, octanediol-1,8, 1-ethylhexanediol-1,3, and decanediol-1,10, cycloaliphatic dihydroxy compounds such as cyclohexanediol-1,4, cyclohexanediol-1,2, 2,2-(4,4'-dihydroxy-dicyclohexyl) - propane and 2,6-dihydroxydecahydronaphthalene and aromatic dihydroxy compounds such as hydroquinone, resorcinol, pyrocatechol, 4,4'-dihydroxydiphenyl, 2,2'-dihydroxydiphenyl, 1,4-dihydroxynaphthalene, 1,6-dihydroxynaphthalene, 2,6-dihydroxynaphthalene, 1,2-dihydroxynaphthalene, 1,5-dihydroxynaphthalene, dihydroxyanthracene, 2,2'-dihydroxydinaphthyl-1,1' and o,m, and p-hydroxybenzyl alcohols.

These mixed polycarbonates can be produced in the same way as the simple polycarbonates, that is to say: mixtures of the aforesaid di-(monohydroxyaryl) alkanes with other dihydroxy compounds of the type mentioned above can be reacted with derivatives of the carbonic acid selected from the group consisting of carbonic diesters, especially diarylesters, phosgene and bis-chlorocarbonic acid esters of dihydroxy compounds.

Thus the mixtures of the dihydroxy compounds can be reesterified with carbonic acid diesters, e.g. with the dimethyl-, diethyl-, dipropyl-, dibutyl-, diamyl-, dioctyl-, dicyclohexyl-, and especially with the diphenyl- and di-o,m, or p-tolyl carbonates, or with mixed esters, for instance with the methyl-ethyl, the methyl-propyl, the ethyl-propyl, the methyl-cyclohexyl, the ethylcyclohexl, the propyl-cyclohexyl, the methyl-phenyl, the ethyl-phenyl, the propyl-phenyl, the ethyl-o-, m- or p-tolyl and the cyclohexyl-phenyl carbonate particularly at elevated temperatures from about 50–330° C. and especially from about 120 to about 290° C. and under reduced pressure for instance up to 0.1 mm. mercury gauge.

By re-esterifying the mentioned carbonic acid diesters, the corresponding alkyl or cycloalkyl alcohols or the corresponding phenols are split off.

The re-esterifying process has to be carried out while excluding oxygen. We prefer to pass an inert gas such as hydrogen, nitrogen, or carbon dioxide gas through the melt.

The re-esterification may be activated by re-esterifying catalysts, such as inorganic bases, for example, sodium hydroxide and potassium hydroxide, high boiling organic bases, such as acridine, metal hydrides, such as lithium and calcium hydride, alkali or alkaline earth metals, such as sodium, potassium, magnesium, and calcium, metal oxides, such as zinc oxide, aluminum oxide, lead oxide, antimony trioxide, cerium oxide, and boron oxide, acids, such as phosphoric acid and p-toluene sulphonic acid, and salts, such as sodium benzoate, calcium acetate, and boron phosphate, and alcoholates and phenolates.

The polycarbonates can also be produced by introducing phosgene into solutions of mixtures of the aforesaid dihydroxy compounds in organic bases, such as dimethylaniline, diethylaniline, trimethylamine, and pyridine, or in indifferent organic solvents, such as petrol, ligroin, cyclohexane, methyl cyclohexane, benzene, toluene, xylene, chloroform, methylene chloride, carbon tetrachloride, trichloroethylene, di-chloroethane, methylacetate, and ethylacetate, with addition of an acid-binding agent, e.g. tertiary amines.

A process particularly suitable for producing polycarbonates consists in introducing phosgene into the aqueous solution or suspension of alkali or alkaline earth metal salts, such as lithium, sodium, potassium, and calcium salts of the dihydroxy compounds, preferably in the presence of an excess of a base, such as lithium, sodium, potassium, and calcium hydroxide or carbonate. The polycarbonate then precipitates out from the aqueous solution.

The conversion in the aqueous solution is promoted by the addition of reaction inert solvents of the kind mentioned above which are capable of dissolving phosgene and eventually the produced polycarbonate.

The phosgene may be used in an equivalent amount. Generally, however, it is preferable to use an excess of the phosgene. Suitable temperatures are from about 0° C. to about 100° C.

Finally it is also possible to react bis-chlorocarbonates of di-(monohydroxyaryl) alkanes, optionally mixed with the aforementioned other dihydroxy compounds, optionally also with mixtures of such other dihydroxy compounds and with di-(monohydroxyaryl) alkanes. The condensation proceeds suitably in the presence of inert solvents, and acid-binding materials, e.g. tertiary amines.

When using phosgene or bis-chlorocarbonic acid esters as derivatives of the carbonic acid in producing polycarbonates according to the invention, catalysts also may be advantageous. Such catalysts are for instance tertiary or quaternary organic bases or salts thereof, such as trimethylamine, triethylamine, dimethylaniline, diethylaniline, dimethyl-cyclohexylamine, and pyridine, or for instance the corresponding hydrochlorides, and tetramethylammoniumhydroxide, triethyloctadecylammoniumchloride, tri-methyl-benzylammoniumfluoride, triethylbenzylammoniumchloride, dimethyldodecylammoniumchloride, dimethylbenzylphenylammoniumchloride, trimethyl - cyclohexylammoniumbromide, and N-methylpyridiniumchloride, in amounts from about 0.05 to about 5% by weight. These compounds may be added to the reaction mixtures before or during the reaction.

Further in some of these cases we prefer to add surface-active agents, such as alkali metal salts of higher fatty acids or of sulphonic acids of higher aliphatic or of aromatic hydrocarbons and polyoxyethylated alcohols and phenols. Greater amounts of the quaternary ammonium bases mentioned above also act as such surface-active agents.

In the production of polycarbonates according to the various processes it further is advantageous to employ small amounts of reducing agents, for example sodium or potassium sulphide, sulphite, and dithionite, or free phenol and p-tert-butyl-phenol.

By adding monofunctional compounds which are capable of reacting with phosgene or with the end groups of the polycarbonates consisting of the chlorocarbonic acid ester group and which terminate the chains, such as the phenols, for instance, phenol, tert-butylphenol, cyclohexylphenol, and 2,2-(4-hydroxy-phenyl-4'-methoxyphenyl)-propane, further aniline and methylaniline, it is possible to regulate the molecular weight of the polycarbonoates in wide limits. See in this connection U.S. patent application Serial No. 527,802, filed March 21, 1956, now abandoned.

Suitable polycarbonates are obtained for example from 4,4'-dihydroxydiphenyl-methylethyl methane or from 4,4'-dihydroxydiphenyl-dimethyl methane or from a mixture of 95% of 4,4'-dihydroxydiphenyl-dimethyl methane and 5% of 4,4'-dihydroxydiphenyl methane or from 90% of 4,4'-dihydroxydiphenyl-dimethyl methane and 10% of 4,4'-dihydroxydiphenyl-1,1-cyclohexane.

Sheets or films produced from the said polycarbonates are characterized by properties which make them suitable for all types of photographic film supports. The tensile strength thereof, even in the unstretched condition, is practically equal to that of an acetyl cellulose film. The extensibility and impact strength are substantially higher than in acetyl cellulose film. By stretching, it is possible to produce breaking loads which, with good extensibility and impact strength, approach those of terephthalic acid polyesters. In addition, it is particularly to be noted that these good mechanical properties are also maintained in the unstretched condition, even when subjected for a relatively long time to temperatures up to approximately 160°. Thus, after being kept as 140° in the air for 6 weeks, it was still not possible to detect any decrease in the mechanical properties. Another important feature is the excellent stability with respect to the action of light, even ultraviolet radiation, air and moisture. The absorption of water is extraordinarily low (0.5% and lower), so that the films maintain their size particularly well, even in the wet state. Particularly desirable stretching techniques for the polycarbonates of the present invention are described in U.S. patent application Serial No. 708,740, filed January 14, 1958, now abandoned.

Since the polycarbonates to be used according to the invention also dissolve well in a series of solvents, such as chlorinated aliphatic hydrocarbons and aromatic hydrocarbons (e.g. benzene, xylene, toluene, methylenechloride, chloroform, esters, such as alkylacetates, ketones, such as acetone, or in mixtures of such solvents, the sheets or layers can be manufactured by the conventional casting method on a belt or drum machine, the advantages of this method, namely the production of a uniform thickness and optical clarity in transmission and on the surface, being fully obtained. The thoroughly dry raw material may be dissolved in a vessel provided with stirrer mechanism, preferably a high-speed stirrer, for example in a solvent having a low boiling temperature such as methylene chloride, to a solution of approximately 50,000 cp. It is also possible to add small amounts of higher-boiling solvents (such as chloroform, propyl acetate and butyl acetate), these not necessarily having to be good solvents for the plastic. The adidtion of small amounts of plasticizers, such as tricresyl phosphate, is also advisable, depending on the quality which is required. After the air has been removed, the solution is cast on a casting machine according to the thickness required and also with the speed customary for acetyl cellulose sheets or layers. If necessary, the polyesters to be used according to the invention can also be processed to films from the melt in a manner known per se. Dyestuffs or pigments can of course be added to the solutions or melts of the polycarbonates prior to the shaping thereof.

Before the light-sensitive layers, especially silver halide emulsion layers or photographic auxiliary layers, are applied to the layer support, the latter is generally provided with suitable bonding or subbing layers, which can be prepared by various methods.

For example, prior to the application of hydrophilic colloid layers (photograhic emulsions) to the layer support, the latter can be provided with a thin intermediate subbing layer of polyvinyl chloride copolymers and nitrocellulose or organic cellulose esters, an additional thin intermediate layer of cellulose esters super-imposed thereon and a thin gelatin-containing layer as third layer.

The vinyl chloride copolymer of the first layer is preferably a copolymer of about 40–70 parts by weight of vinyl chloride with about 30–60 parts by weight of copolymerizable components selected from the group consisting of lower alkyl esters of ethylenically unsaturated carboxylic acids and vinyl esters of lower fatty acids, such as methyl-, ethyl-, propyl-, butyl esters of acrylic acid, methacrylic acid, crotonic acid, maleic acid, on the one hand, and vinylacetate, vinylpropionate and vinylbutyrate on the other hand. These polymers can be made by the processes described in "Vinyl and Related Polymers," by C. E. Shildknecht, published 1952 by John Wiley & Sons, Inc., New York. Suitable organic cellulose esters are for instance mixed esters of cellulose with acetic acid and with fatty acids having 3–4 carbon atoms such as cellulose acetopropionate and cellulose acetobutyrate having from about 37% acetate and 9% other fatty acetate radicals, to about 12% acetate and 42% fatty acid radicals, based on the total weight of the cellulose ester. For the production of the first layer the cellulose esters are preferably applied in quantities equivalent to 10–70 percent by weight calculated on the total amount of polymers and cellulose esters. See U.S. patent application Serial No. 533,036, filed September 7, 1955, now abandoned.

Another suitable subbing layer combination consists for example of nitrocellulose and an epoxy resin, above which is placed a second layer of gelatin. It is preferred that the nitrocellulose be present in an amount from 10 to 70 percent by weight of the total mixture of these resins. Another layer of nitrocellulose can also be applied between the nitrocellulose epoxy resin layer and the gelatin layer. Such epoxy resins are preferred which are obtained by reaction of epichlorohydrin with the di-(monohydroxyaryl) alkanes used for the manufacture of the polycarbonates of the film support (compare "Modern Plastics" [1954] pp. 242 ff.). Instead of the epoxy resin in the base layer, it is also possible to use a polycarbonate ester of a di-(monohydroxyaryl) alkane, again in admixture with nitrocellulose. The usual coating devices can be used for the application of the intermediate layers.

*Example 1*

100 kilograms of poly-(2,2-bis(4-hydroxyphenyl)propane carbonate) are dissolved in a mixture of 600 kg. of methylene chloride. The solution is filtered, deaerated by heating at 50° C. and thereafter it is cast to form a clear unplasticized film with a thickness of 0.1 mm. Three layers are applied to both sides of the film in a suitable coating apparatus by the dipping or reeling method, these layers consisting of the following solutions:

1st layer:
    20 g. of a copolymer containing 60 percent by weight of vinyl chloride and 40 percent by weight of vinyl acetate,
    3 g. of nitrocellulose (nitrogen content 12.1%),
    300 cc. of chloroform,
    700 cc. of ethyl acetate.

2nd layer:
    15 g. of nitrocellulose,
    250 cc. of butyl acetate,
    150 cc. of ethyl acetate,
    600 cc. of ethanol.

3rd layer:
    10 g. of gelatin,
    1.6 g. of phthalic acid or salicylic acid,
    0.7 g. of glyoxal,
    60 cc. of water,
    50 cc. of butyl acetate,
    890 cc. of methanol.

After being thoroughly dried, a clear film is obtained which is coated with a silver halide gelatin emulsion and if required also an antihalation layer. The adhesion of the layers is sufficient, even in photographic baths.

The alteration in length of the film at 20° and 60% relative humidity is 0.01–0.3% after soaking in water for 16 hours (that of a cellulose triacetate film is 0.4–0.6%).

The second side can be provided with one of the antistatic layers customary for cinematographic film, if required also with a lubricant.

*Example 2*

100 kilograms of poly(2,2-bis(4-hydroxyphenyl)butane carbonate) are dissolved in a mixture of 550 cc. of methylene chloride and 20 kg. of butyl acetate, with addition of 5 kg. of di(n-butyl) phthalate, and is cast to form a foil with a thickness of 0.2 mm. This foil is stretched to 1.8 times its length at 80° on a stretching machine and thereafter transversely to 1.5 times its width. The foil is thereafter further treated with the following solutions:

1st layer:
    4% of nitrocellulose,
    2% of epoxy resin (reaction product of epichlorohydrin and 2,2-bis(4-hydroxyphenyl) propane containing 0.05 mol of epoxide and 0.36 mol of hydroxyl per 100 g. of resin. Suitable products are also the resins which are obtained on the market under the trade name "Epikote"),
    94% of ethyl acetate.

2nd layer:
    2.3% of gelatin,
    22.7% of acetic acid,
    75.0% of methyl alcohol.

The light-sensitive silver halide gelatin layer and a suitable backing layer are then applied by casting. Instead of silver halide gelatin layers also other layers may be applied the binding agent of which comprises or consists of other customary natural or synthetic binding agents, such as polyvinylalcohol, partially hydrolyzed polyvinylacetate, polyvinylpyrrolidone. Instead of silver halogenides there may also be used other light-sensitive substances such as diazo-compounds.

The resulting films have excellent dimensional stability with good bonding of the layers. Other plasticizers that can be used for the polycarbonate support are di-n-butyl adipate, benzyl-n-butyl adipate, tricresyl phosphate of mixed or individual cresols, triphenyl phosphate, o-cresyl ester of n-butyl sulfonic acid, and phenyl n-amyl sulfonate.

*Example 3*

Three layers are applied to both sides of a sheet as in

Example 1, the said layers being produced of the following solutions:

1st layer:
  2% of nitrocellulose,
  2% of epoxy resin (as disclosed in Example 2),
  96% of ethyl acetate.
2nd layer:
  2% of nitrocellulose,
  68% of ethyl acetate,
  30% of methyl alcohol.
3rd layer:
  2.3% of gelatin,
  22.7% of acetic acid,
  75.0% of methyl alcohol.

The film obtained after the necessary photographic layers had been applied corresponds to that obtained according to Example 1 as regards its properties.

*Example 4*

Three layers of the following solutions are applied to both sides of a sheet as in Example 1:

1st layer:
  2% of polycarbonate of 2,2(4,4'-dihydroxydiphenyl)-pentane (K-value: 45),
  2% of nitrocellulose,
  96% of ethyl acetate.
2nd layer:
  2% of nitrocellulose,
  68% of ethyl acetate,
  30% of methyl alcohol.
3rd layer:
  2.3% of gelatin,
  22.7% of acetic acid,
  75.0% of methyl alcohol.

In this case as well, after application of the necessary photographic layers, a film is produced with good bonding of the layers and excellent maintenance of dimensions.

The above combinations are schematically shown in the drawing where the single figure is a fragmentary section of a photographic material consisting of a polycarbonate support 1, a combination of subbing layers 2 coated on said support, and a silver halide gelatin emulsion layer 3 coated on said subbing layers.

This application is a continuation-in-part of our application Serial No. 577,362, filed April 10, 1956, that has now been abandoned.

What is claimed is:

1. A photographic combination of a supporting film and a silver halide emulsion layer carried on the film, said supporting film being a high molecular weight polycarbonate of a di-(monohydroxyaryl)alkane containing recurring di(monohydroxyaryl)alkane carbonate units, and the emulsion layer being adhered to the surface of the polycarbonate film by means of an intervening subbing stratum consisting of a first layer of nitrocellulose and a bonding agent selected from the class consisting of (*a*) an epoxy resinous reaction product of epichlorohydrin with a di(monohydroxyaryl)alkane and (*b*) a polycarbonate of a di(monohydroxyaryl)alkane, and a second layer of gelatin overlying said first layer and carrying the emulsion layer.

2. Photographic material as defined in claim 1 in which the subbing stratum is a layer of a mixture of nitrocellulose and an epoxy resinous reaction product of epichlorohydrin with a di(monohydroxyaryl)alkane, and an overlying layer of gelatin.

3. Photographic material as defined in claim 1 in which the subbing stratum is a layer of a mixture of nitrocellulose and a polycarbonate of a di(monohydroxyaryl)alkane, and an overlying layer of gelatin.

4. Photographic material as defined in claim 1 comprising an additional intermediate layer of nitrocellulose arranged between said first and said second layer.

References Cited in the file of this patent
UNITED STATES PATENTS

| | | |
|---|---|---|
| 2,237,017 | Thinius | Apr. 1, 1941 |
| 2,874,046 | Klockgether et al. | Feb. 17, 1959 |